Patented June 10, 1941

2,245,499

UNITED STATES PATENT OFFICE 2,245,499

CELLULOSE DERIVATIVE, WAX EMULSION FOR COATING WRAPPING MATERIALS

Frank H. Reichel and Augustus Edward Craver, Fredericksburg, Va., assignors to Sylvania Industrial Corporation, Fredericksburg, Va., a corporation of Virginia No Drawing. Application June 7, 1939, Serial No. 277,952

12 Claims. (Cl. 91—68)

This invention relates in general to coating compositions and in particular to improved compositions adapted for coating non-fibrous, homogeneous organic plastic materials, especially wrapping materials, and to the article coated with such compositions.

Heretofore in the coating of non-fibrous organic plastic materials swelling in water, for example Cellophane, with cellulose derivative lacquers, the evaporation of the organic solvents from the lacquer has been accompanied by a substantial loss of moisture from the base sheet material, in consequence of which the sheet material becomes embrittled. To overcome this brittleness, it has been proposed to subject the sheet material to a prehumidification and a post-humidification to reimpart water to the base and preserve its flexibility. Further, the adherence of such prior lacquers to sheet materials of the class described has been unsatisfactory; the lacquer film tends to separate from the base when the latter becomes swollen with water.

A general object of the invention is the provision of an improved composition adapted to give coatings characterized by being perfectly non-tacky at ordinary temperatures, but readily heat-sealable at 200° F.

It is another object of the invention to incorporate with lacquers and like coating compositions a substance adapted to increase the adherence of the coating to the base after the evaporation of the solvents.

A further specific object of the invention is to provide a lacquer or coating composition for non-fibrous, organic plastic materials swelling in water, especially sheet materials, comprising a component adapted to improve the adherence of the coating to such materials and which enables the material to be coated without a substantial loss of water from the base during the evaporation of the solvents.

Other objects of the invention will in part be obvious and will in part appear hereinafter.

The invention accordingly comprises novel products possessing the characteristics, properties and the relation of constituents, all as exemplified in the following detailed disclosure and the scope of the application of which will be indicated in the claims.

In accordance with this invention, the disadvantages above mentioned are overcome by a coating comprising a film-forming cellulose derivative, a volatile liquid organic solvent therefor, a small amount of water, and a small amount of a solid organic hydrophilic colloid which is insoluble in the organic solvent, and which is colloidally dispersed in the composition, the several ingredients of the composition being present in such proportions as to give, upon evaporation of the solvents at an elevated temperature, a transparent non-tacky coating in which the hydrophilic colloid is dispersed as fine particles. The composition is especially adapted for coating sheet material which has a tendency to swell in water, such as Cellophane.

For the cellulose derivative, there may be employed a member of the group consisting of cellulose esters such, for example, as nitrocellulose, cellulose acetate, cellulose formate; cellulose ethers such, for example, as methyl cellulose, ethyl cellulose, benzyl cellulose; hydroxy-alkyl ethers of cellulose such, for example, as hydroxy methyl cellulose, hydroxy ethyl cellulose and hydroxy propyl cellulose; or mixed esters of cellulose and mixed ethers of cellulose, as well as mixtures of one or more cellulose derivatives from the above mentioned classes.

The solvent for the cellulose derivative may comprise a known volatile organic solvent mixture. In the preferred embodiment of the invention, there is employed a mixture of volatile organic liquids comprising an ester such, for example, as ethyl acetate, butyl acetate, amyl acetate and a suitable diluent such, for example, as toluene, petroleum, ether, benzene, etc., the diluent being immiscible with water. Mixtures of suitable volatile lacquer solvents and diluents are referred to hereinafter collectively as "organic solvent."

For the preparation of moistureproof coating compositions, there may be employed, in addition, a moistureproofing ingredient such, for example, as a wax, preferably paraffin wax of a high melting point, although any suitable animal, mineral, vegetable wax may be employed.

For the preparation of flexible coatings, the composition of the invention may comprise, in addition to the above ingredients, a suitable plasticizer which is soluble in the composition. As examples of suitable plasticizers, there may be employed dibutyl phthalate, keto-aromatic acids and their esters with monobasic aliphatic alcohols such, for example, as the ethyl ester of benzoyl benzoic acid.

If desired, there may be added to the novel composition of the invention gums and resins, oils, especially blown oils, chlorinated rubber, chlorinated diphenyl, pigments and other lacquer ingredients in amounts necessary to impart to the composition the desired properties.

The hydrophilic colloid employed in the invention is a solid organic substance soluble or swellable in water, but insoluble in the organic solvent, that is a substance adapted to form a hydrophilic colloidal dispersion with water. The term "hydrophilic colloid" as used in the specification and claims is intended to designate any solid organic substance which swells in water or disperses therein to form a colloidal solution, in accordance with the definition given in Hackh's Chemical Dictionary, 2nd ed. 1937, p. 470 and in Merriam's Webster's New International Dictionary, 2nd ed. p. 526, and the term "colloid" is used as a noun in accordance with said dictionaries and with the general practice in the art as illustrated in U. S. Patents Nos. 1,894,467, 2,071,353 and 2,145,695. Among the hydrophilic colloids which may be employed are dextrine, agar agar, gelatine, casein and water-soluble gums, for example, gum arabic, gum tragecanth, and the like, ethers, alkyl ethers, hydroxy-alkyl ethers, carboxy-alkyl ethers, and alkali metal salts of carboxy-alkyl ethers of cellulose, and synthetic resins, all of said compounds being soluble in water, but insoluble in the organic solvent. Of the hydrophilic colloids, it has been found that starch and gelatine give the best adhesion of the coating to the base.

The solid organic hydrophilic colloid is preferably comminuted and first dispersed in the water to form a colloidal solution which is added to the lacquer. Since the hydrophilic colloid is insoluble in the lacquer solvent, it remains colloidally dispersed therein.

Suitable hydrophilic colloids are those which are insoluble in the solvent or lacquer composition, but are soluble in water and are colloidally dispersed in the composition and upon evaporation of the lacquer solvent, the hydrophilic colloid forms a multiplicity of fine particles disseminated throughout the dried film or coating.

In general, the several ingredients of the composition may be employed broadly within the approximate limits as follows, the ingredients being in parts by weight:

| | Per cent |
|---|---|
| Cellulose derivative | 30–80 |
| Water | up to 5 |
| Solid hydrophilic colloid | up to 2 | to which may be added, if desired, one or more of the following ingredients:

| | Per cent |
|---|---|
| Plasticizer | up to 40 |
| Wax | up to 5 |
| Blown oil | up to 5 |
| Gum or resin | up to 40 |

The invention will be explained in connection with the following tables of specific examples which are merely representative illustrations and which are in no sense intended to limit the invention to the exact details therein set forth. In the examples, all ingredients are expressed in percentages by weight:

| | I | II | III |
|---|---|---|---|
| | Percent | Percent | Percent |
| Nitrocellulose | 66 | 52 | 50 |
| Acetanilide | 6 | 6 | 6 |
| Benzoyl benzoic acid | 10 | 10 | 10 |
| Dibutyl phthalate | 18 | 10 | 10 |
| Ethyl benzoyl benzoate | | 8 | 8 |
| Blown rapeseed oil | | | 1 |
| Oxidized ester gum | | 12.5 | 12.5 |
| Paraffin | | 1.5 | 2.5 |

From about 100 to 200 parts of one of the above compositions may be dissolved in 1000 parts of a suitable organic solvent such, for example, as a mixture consisting of 16% butyl acetate, 10% ethyl acetate and 74% toluene.

A second solution is now prepared consisting of, for example:

| | I | II | III |
|---|---|---|---|
| | Percent | Percent | Percent |
| Water | 95 | 90 | 90 |
| Gelatine | 5 | | |
| Starch | | 10 | |
| Gum arabic | | | 10 |

From about 3 to 7 parts of one of the above aqueous solutions are now added in small quantities at a time to about 1000 parts of one of the organic solvent mixtures with vigorous stirring until the hydrophilic colloid which was dissolved in the water, has formed a colloidal dispersion in the organic solvent mixture. For the production of perfectly transparent coatings, the resulting lacquer preferably is filtered in a known manner to remove any suspended particles which may be too coarse for the object of the invention. The product thus obtained may then be applied as a coating to a suitable base and the coating dried by evaporation of the solvents at an elevated temperature such, for example, as in a drier heated to a temperature of from 60°–80° C.

These novel compositions may be used in a number of arts, as in the manufacture of self-sustaining foils and films, and coatings of all kinds, but are particularly advantageous for coating sheet materials formed of non-fibrous, organic plastic materials swelling in water such, for example, as regenerated cellulose, alkali-soluble cellulose ethers, hydroxy-alkyl cellulose ethers, gelatine, casein and the like. Such sheet materials usually contain a substantial quantity of water which imparts flexibility. The water contained in the present coating is evaporated simultaneously with the evaporation of the organic solvent, whereas the water, if any, contained in the base sheet material is not evaporated, in consequence of which the base does not require post-humidification to reimpart flexibility thereto.

During the drying of the lacquer, the hydrophilic colloid, being immiscible with the cellulose derivative, is colloidally dispersed within the coating in the form of a multiplicity of fine particles. The particles of the hydrophilic colloid impart to the coating, inter alia, two novel and valuable properties; they render the surface of the coating substantially less tacky than a coating of the same type not containing this substance, and they increase materially the adherence of the coating to the base. The coatings of the invention are characterized by being perfectly non-tacky at 100° F. but readily heat-sealable at 200° F. In mixtures in which either the water or the hydrophilic colloid is omitted, the composition will be too tacky for use as a coating on wrapping materials. The ability to produce non-tacky coatings in accordance with this invention permits a greater choice in the other ingredients, especially in the amount of plasticizers, gums and blown oils which may be employed in the composition.

It will thus be seen that by means of the present invention, there has been provided novel compositions and articles formed with the same, and since certain changes may be made in the above compositions and articles and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the same permits.

This application is a continuation-in-part of our co-pending application Serial No. 242, filed January 3, 1935.

We claim:

1. A composition of matter adapted for the production of coatings and films comprising a solution of a film-forming cellulose derivative belonging to the group consisting of esters, ethers, hydroxy-alkyl ethers, mixed esters and mixed ethers of cellulose and a wax in a volatile liquid organic solvent therefor, and colloidally dispersed therein a small amount of water and a small amount of a solid organic hydrophilic colloid which is soluble in water but insoluble in said organic solvent, said composition yielding upon evaporation of the solvent at an elevated temperature a transparent non-tacky coating in which said hydrophilic colloid is distributed in fine particles.

2. A composition of matter adapted for the production of moistureproof coatings and films comprising a dispersed mixture of a film-forming cellulose derivative belonging to the group consisting of esters, ethers, hydroxy-alkyl ethers, mixed esters and mixed ethers of cellulose, wax, a volatile liquid organic solvent for the cellulose derivative and the wax, water, and a solid organic hydrophilic colloid, said composition yielding upon evaporation of the solvent at an elevated temperature a transparent non-tacky coating in which said hydrophilic colloid is distributed in fine particles.

3. A composition of matter adapted for the production of moistureproof coatings and films comprising a dispersed mixture of a film-forming cellulose derivative belonging to the group consisting of esters, ethers, hydroxy-alkyl ethers, mixed esters and mixed ethers of cellulose, wax, a plasticizer, a volatile liquid organic solvent for the cellulose derivative, the wax and the plasticizer, water, and a solid organic hydrophilic colloid which is soluble in water but insoluble in said organic solvent, said composition yielding upon evaporation of the solvent at an elevated temperature a transparent non-tacky coating in which said hydrophilic colloid is distributed in fine particles.

4. A composition of matter adapted for the production of moistureproof coatings and films comprising a dispersed mixture of a film-forming cellulose derivative belonging to the group consisting of esters, ethers, hydroxy-alkyl ethers, mixed esters and mixed ethers of cellulose, wax, a plasticizer, a volatile liquid organic solvent for the cellulose derivative, the wax and the plasticizer, about 5% of water, and about 2% by weight of a solid organic hydrophilic colloid which is soluble in water but insoluble in said organic solvent, said composition yielding upon evaporation of the solvent at an elevated temperature a transparent non-tacky coating in which said hydrophilic colloid is distributed in fine particles.

5. A composition of matter adapted for the production of moistureproof and transparent coatings and films comprising a dispersed mixture of from about 30% to 80% of a film-forming cellulose derivative belonging to the group consisting of esters, ethers, hydroxy-alkyl ethers, mixed esters and mixed ethers of cellulose, a wax, a volatile liquid organic solvent for the cellulose derivative and the wax, water, a solid organic hydrophilic colloid which is soluble in water but insoluble in said organic solvent, said composition yielding upon evaporation of the solvent at an elevated temperature a transparent non-tacky coating in which said hydrophilic colloid is distributed in fine particles.

6. A composition of matter adapted for the production of moistureproof, transparent and non-tacky coatings and films comprising a dispersed mixture of from about 30% to 80% of a film-forming cellulose derivative belonging to the group consisting of esters, ethers, hydroxy-alkyl ethers, mixed esters and mixed ethers of cellulose, a wax, a plasticizer, a volatile liquid organic solvent for the cellulose derivative, the wax and the plasticizer, water, and a solid organic hydrophilic colloid which is soluble in water but insoluble in said organic solvent, said composition yielding upon evaporation of the solvent at an elevated temperature a transparent non-tacky coating in which said hydrophilic colloid is distributed in fine particles.

7. A composition of matter adapted for the production of coatings and films comprising a solution of a film-forming cellulose derivative belonging to the group consisting of esters, ethers, hydroxy-alkyl ethers, mixed esters and mixed ethers of cellulose and a wax in a volatile liquid organic solvent therefor, and colloidally dispersed therein a small amount of water, and a small amount of a solid organic hydrophilic colloid which is soluble in water but insoluble in said organic solvent, said composition yielding upon evaporation of the solvent at an elevated temperature a transparent coating which is non-tacky at room temperature but tacky at 200° F.

8. As an article of manufacture a non-fibrous material swelling in water having a transparent non-tacky coating directly thereon comprising a film-forming cellulose derivative belonging to the group consisting of esters, ethers, hydroxy-alkyl ethers, mixed esters and mixed ethers of cellulose and a wax, and having a multiplicity of fine particles of a solid organic hydrophilic colloid which are colloidally dispersed in said coating.

9. As an article of manufacture a non-fibrous organic plastic material swelling in water having a transparent non-tacky coating directly thereon comprising a film-forming cellulose derivative belonging to the group consisting of esters, ethers, hydroxy-alkyl ethers, mixed esters and mixed ethers of cellulose, a plasticizer and a wax, and having a multiplicity of fine particles of a solid organic hydrophilic colloid distributed therein.

10. As an article of manufacture a cellulose derivative swelling in water having a transparent non-tacky coating directly thereon comprising a film-forming cellulose derivative belonging to the group consisting of esters, ethers, hydroxy-alkyl ethers, mixed esters and mixed ethers of cellulose, a wax and a plasticizer, and having a multiplicity of fine particles of a solid organic hydrophilic colloid distributed therein.

11. As an article of manufacture regenerated cellulose having a transparent non-tacky coating directly thereon comprising a film-forming cellulose derivative belonging to the group consisting of esters, ethers, hydroxy-alkyl ethers, mixed esters and mixed ethers of cellulose, a plasticizer and a wax, and having a multiplicity of fine particles of a solid organic hydrophilic colloid distributed therein.

12. As an article of manufacture a wrapping material comprising a sheet of regenerated cellulose having a surface coated directly with a transparent non-tacky coating comprising from about 30% to 80% of a film-forming cellulose derivative belonging to the group consisting of esters, ethers, hydroxy-alkyl ethers, mixed esters and mixed ethers of cellulose, a wax and a plasticizer, said composition having a multiplicity of fine particles of a solid organic hydrophilic colloid distributed therein.

FRANK H. REICHEL.
AUGUSTUS EDWARD CRAVER.